United States Patent [19]

Kawakami et al.

[11] 4,439,586

[45] Mar. 27, 1984

[54] PROCESS FOR PREPARING POLYARYLATES

[75] Inventors: James H. Kawakami, Piscataway; Benito See, Belle Mead; Thomas R. Jones, Lebanon; Louis M. Maresca, Belle Mead, all of N.J.

[73] Assignee: Union Carbide Corporation, Danbury, Conn.

[21] Appl. No.: 393,556

[22] Filed: Jun. 30, 1982

[51] Int. Cl.³ .................. C08G 63/18; C08G 63/66
[52] U.S. Cl. ............................... 525/169; 525/68; 525/173; 525/174; 525/175; 525/176; 525/177; 525/437; 525/439; 525/440; 525/444; 525/445; 525/448; 528/125; 528/126; 528/128; 528/173; 528/176; 528/179; 528/180; 528/181; 528/182; 528/190; 528/191; 528/193; 528/194; 528/195; 528/206; 528/207; 528/222; 528/225; 528/271
[58] Field of Search .............. 528/125, 126, 128, 173, 528/176, 179–182, 190–191, 193–195, 271, 206, 207, 222, 225; 525/68, 173, 169, 174, 175, 176, 177, 437, 439, 440, 444, 445, 448

[56] References Cited

U.S. PATENT DOCUMENTS

| 4,294,956 | 10/1981 | Berger et al. | 528/179 |
| 4,294,957 | 10/1981 | Berger et al. | 528/179 |
| 4,296,232 | 10/1981 | Maresca et al. | 528/179 |
| 4,314,051 | 2/1982 | Berger et al. | 528/179 |
| 4,386,186 | 5/1983 | Maresca et al. | 525/68 |

*Primary Examiner*—Lester L. Lee
*Attorney, Agent, or Firm*—Donald M. Papuga

[57] ABSTRACT

An improved process for preparing a polyarylate having a reduced viscosity of from about 0.1 to greater than 1.0 dl/gm comprising the following steps:
(a) reacting an acid anhydride derived from an acid containing from 2 to 8 carbon atoms with at least one dihydric phenol to form the corresponding diester; and
(b) reacting said diester with at least one aromatic dicarboxylic acid at a temperature sufficient to form the polyarylate, wherein the improvement comprises carrying out said process in the presence of a particular solid adsorbent.

24 Claims, No Drawings

PROCESS FOR PREPARING POLYARYLATES

BACKGROUND OF THE INVENTION

This invention is directed to an improved process for preparing polyarylates.

Polyarylates are polyesters derived from a dihydric phenol, particularly 2,2-bis(4-hydroxyphenyl)propane, also identified as Bisphenol-A, and an aromatic dicarboxylic acid, particularly mixtures of terephthalic and isophthalic acids. These polyarylates are high temperature, high performance thermoplastic polymers with a good combination of thermal and mechanical properties. They also have good processability which allows them to be molded into a variety of articles.

Many processes have been described in the literature for the preparation of polyarylates. One such process is the diacetate process. In the diacetate process, a dihydric phenol is converted to its diester derivative, which is then reacted with an aromatic dicarboxylic acid(s) to form the polyarylate.

However, the polyarylate produced by the diacetate process have a tendency to be colored which could make them unsuitable in some end use applications. Thus there is a desire to improve the color of the polyarylate for such end use applications.

Activated charcoal and other adsorbents have been used to remove color or odor from liquids and gases. (V. R. Deitz, Bibliography of Solid Adsorbents, Washington, D.C., 1944; J. M. Brown, Revere Sugar Refinery, Charleston, Mass.). For example, extremely large quantities of fuller's earth and other adsorbents are used in purifying petroleum products (C. L. Mantell, "Adsorption," McGraw Hill, New York, 1945). However, the use of adsorbents such as activated charcoal to remove color from polymers is not seen reported in the literature. This may be due to the relative ineffectiveness of removing color from high molecular weight polymers with adsorbents. The use of adsorbents during a polymerization reaction has not been seen to be reported in the literature. There are extensive literature references which show the chemical reactivity of charcoal and other adsorbents. (Zechmeister, McNeely, and Solyom, J. Am. Chem. Soc., 64, 1922 (1942). For example, some charcoals are known oxidizing agents at higher temperatures which would increase the color of most polymers. (E. Ledoux, "Vapor Adsorption, Industrial Applications and Competing Processes," Chemical Pub. Co., Brooklyn, 1945). In addition, physical adsorption decreases with increasing temperature. Thus, the use of adsorbents to improve the color of polyarylate is unexpected.

DESCRIPTION OF THE INVENTION

It has now been found that the use of from about 0.2 to about 2.0 wt. percent, based on the weight of the reaction mixture, of a particular adsorbent in the diacetate process to produce polyarylate polymers improves the color of the resulting polymer.

The improved process for preparing a polyarylate having a reduced viscosity of from about 0.1 to greater than 1.0 dl/gm comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises carrying out said process in the presence of an adsorbent.

The adsorbents used herein include silica gel, activated charcoal derived from wood, paper pulp waste and coconut, and molecular seives, i.e., alumino silicates, and the like. The adsorbent may be added at any point in the polymerization process. Preferably, the adsorbent is added at an early stage of the polymerization reaction.

The acid anhydride suitable for use herein is derived from an acid containing from 2 to 8 carbon atoms. The preferred acid anhydride is acetic anhydride.

Any dihydric phenol well known to those skilled in the art may be used herein. Preferably, the dihydric phenol suitable for the use in this invention is of the following formula:

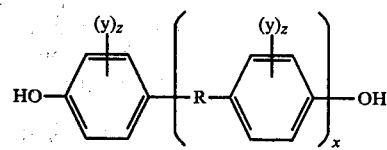

wherein y is independently selected from alkyl groups of 1 to 4 carbon atoms, chlorine or bromine, z independently has a value of from 0 to 4, inclusive, and R is independently selected from a divalent saturated aliphatic hydrocarbon radical, particularly alkylene or alkylidene radicals having from 1 to 8 carbon atoms, especially $C(CH_3)_2$, cycloalkylene or cycloalkylidene radicals having up to and including 9 carbon atoms, O, S, SO, $SO_2$, and CO, x is 0 or 1.

The dihydric phenols that may be used in this invention include the following:
2,2-bis-(4-hydroxyphenyl)propane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)1,2-bis-(phenyl)-propane,
4,4'-(dihydroxyphenyl)ether,
4,4'-(dihydroxyphenyl)sulfide,
4,4'-(dihydroxyphenyl)sulfone,
4,4'-(dihydroxyphenyl)sulfoxide,
4,4'-(dihydroxybenzophenone),
hydroquinone, and
naphthalene diols.

Generally, the dihydric phenol reacts with the acid anhydride under conventional esterification conditions to form the dihydric phenol diester. The reaction may take place in the presence or absence of a solvent. Additionally, the reaction may be conducted in the presence of a conventional esterification catalyst or in the absence thereof.

The aromatic dicarboxylic acid(s) that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents such as halides, alkyl or aryl ethers, and the like. Preferably, mixtures of isophthalic and terephthalic acids are used. The isophthalic acid to terephthalic acid ratio in the mixture is about 20:80 to about 100:0, while the most preferred acid ratio is about 25:75 to about 75:25. Also, from about 0.5 to about 20 percent of at least one aliphatic diacid containing from 2 to about 10 carbon atoms, such as adipic acid, sebacic acid, and the like, or mixtures thereof, may be additionally used in the polymerization reaction.

The preparation of the polyarylate may be carried out in bulk preferably in the presence of from about 10 to about 60, more preferably from about 25 to about 60, and most preferably, from about 30 to about 60 weight percent, based on the weight of the polyarylate produced, of an organic solvent.

The preferred organic solvents are a diphenyl ether compound as described in U.S. Pat. No. 4,294,956, a cycloaliphatic substituted aromatic or heteroaromatic compound, as described in U.S. Pat. No. 4,294,957, and a halogenated and/or etherated substituted aromatic or heteroaromatic compound, as described in U.S. Pat. No. 4,374,239, or mixtures of these.

The diphenyl ether compound, as described in U.S. Pat. No. 4,294,956, may be substituted. These substituents are selected from alkyl groups, chlorine, bromine or any substituent which does not interfere with the polyarylate forming reaction or the reaction forming the diester derivative of the dihydric phenol. Additionally, the diphenyl ether compound may be used with up to 50 weight percent of other compounds, such as various biphenyls or any other compounds which do not interfere with the polyarylate forming reaction or the reaction forming the diester derivative of the dihydric phenol.

The cycloaliphatic compounds, or substituted aromatic or heteroaromatic compounds, as described in U.S. Pat. No. 4,294,957, contain at least one benzylic and/or tertiary hydrogen atoms. These compounds have a boiling point of about 150° to about 350° C., preferably from about 180° to about 220° C., and a solubility parameter of ±4 within the solubility parameter of the polyarylate being produced. Solubility parameter is a measure for correlating polymer solvent interaction. It is defined in "Properties of Polymers," D. W. Van Krevelen, Elsevier Scientific Publishing Co., Amsterdam-Oxford-New York, 1976, pp. 141-155, as the square root of the cohesive energy density.

The cycloaliphatic compounds are of the following formulae:

(I)

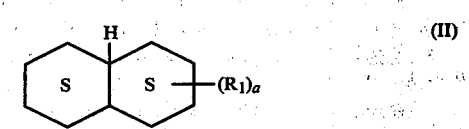
(II)

wherein $R_1$ is independently alkyl of 1 to 6 carbon atoms, cycloalkyl of 6 to 18 carbon atoms, and a is an integer of 1 or 2.

The substituted aromatic compounds are of the following formula:

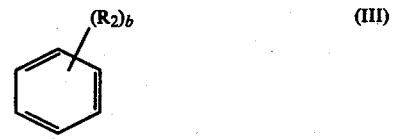
(III)

wherein $R_2$ is independently alkyl of 1 to 6 carbon atoms, cycloalkyl of 6 to 18 carbon atoms and aralkyl or alkaryl of 7 to 18 carbon atoms and wherein the carbon atom of $R_2$ attached directly to the benzene nucleus has 1 or 2 attached hydrogen atoms, and b is an integer of 1 to 6.

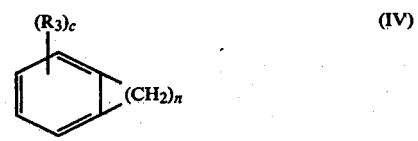
(IV)

wherein $R_3$ is independently alkyl of 1 to 6 carbon atoms, cycloalkyl of 6 to 18 carbon atoms, c is an integer of 1 or 2, and n is an integer of 1 to 6.

The heteroaromatic compounds are of the following formula:

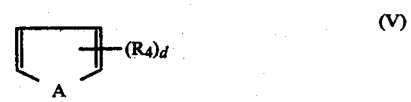
(V)

wherein A is S, O, or $-CH=N-$, $R_4$ is independently alkyl of 1 to 6 carbon atoms, or cycloalkyl of 6 to 18 carbon atoms and wherein the carbon atom of $R_4$ attached directly to the heteroaromatic nucleus has 1 or 2 attached hydrogen atoms, and d is an integer of 1 to 4.

The preferred compounds encompased by structures (I) through (V) include xylenes, cumene, diethylbenzene, diisopropyl benzene, tetrahydronaphthalene or decahydronaphthalene.

Additionally, the cycloaliphatic, substituted aromatic or heteroaromatic compounds may be used with up to 90 weight percent of other compounds such as diphenyl ether, dimethylsulfone, etc.

The halogenated and/or etherated substituted aromatic or heteroaromatic compounds, as described in U.S. Pat. No. 4,374,239, are of formulae:

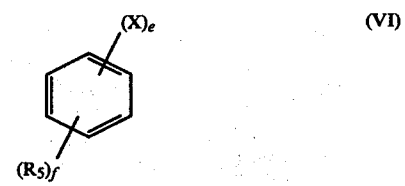
(VI)

wherein X is independently Cl, Br, F, or $OR_6$, e is an integer of 1 to 6, $R_5$ is independently alkyl of 1 to 16 carbon atoms, cycloalkyl of 6 to 18 carbon atoms, aryl of 6 to 18 carbon atoms, or aralkyl or alkaryl of 7 to 18 carbon atoms, $R_6$ is independently alkyl of 1 to 16 carbon atoms or cycloalkyl of 6 to 18 carbon atoms, and f is integer of 0 to (6−e).

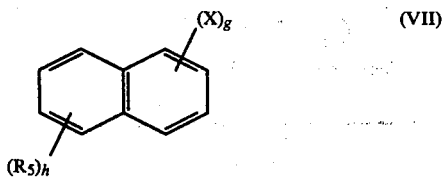

wherein X and $R_5$ are as previously defined, g is an integer of 1 to 8 and h is an integer of 0 to (8−g).

The heteroaromatic compounds are of the following formula:

wherein B is O, S, or —CH=N—, X and $R_5$ are as previously defined, j is an integer of 1 to 4 and k is integer of 0 to (4−j).

The compounds encompassed structures (VI) through (VIII) include 1,2,3-trichlorobenzene; 1,2,4-trichlorobenzene, 1,2- or 1,3- or 1,4-dichlorobenzene; 1,2,3- or 1,2,4- or 1,3,5-trimethoxybenzene; 1,2- or 1, or 1,4-dibromobenzene; chlorobenzene; bromobenzene; 1-chloronaphthalene; 2-chloronaphthalene; 1-bromonaphthalene; 2-bromonaphthalene; 1,2- or 1,3- or 1,4-dimethoxybenzene; 2-bromotoluene; 2-chlorotoluene; 4-bromotoluene; 4-chlorotoluene; anisole; 2-methylanisole; 3-methylanisole; 4-methylanisole; 2-chloroanisole; 3-chloroanisole; 4-chloroanisole; 2-bromoanisole; 3-bromoanisole and 4-bromoanisole.

Additionally, the halogenated and/or etherated substituted aromatic or heteroaromatic compounds may be used with up to 90 weight percent of other compounds such as diphenyl ether, dimethylsulfone, etc.

The amount of said solvents could vary during the polymerization reaction. For example, it may be advantageous to increase progressively the amount of these solvents to maintain the reaction medium at constant viscosity.

A catalyst may be used to accelerate the rate of polyarylate formation. All the conventional catalysts capable of accelerating an ester exchange reaction are suitable for use herein. These include metal salts, generally the Group VII and VIII metal salts, such as magnesium, manganese or zinc salts. The salts are generally organic acid salts and include acetates, propionates, benzoates, oxalates, acetylacetonates, or mixtures thereof. A preferred catalyst is magnesium acetate. The catalyst is present in the reaction in a catalytically effective amount which can be, for example, from about 1 to about 1000, preferably from about 10 to about 50, parts per million, based on the weight of the polyarylate produced.

The polyarylate polymer may be prepared in two reaction vessels by adding the acid anhydride and dihydric phenol to a reaction vessel and reacting these under esterification conditions described, supra to form the diester derivative of the dihydric phenol. Residual acid anhydride may then be removed by methods known in the art, such as by vacuum distillation, or by chemical reaction with reactants which are not harmful to the polymerization, such as water, alcohols, dihydroxy compounds, and the like. The diester derivative may then be added to a second reaction zone. Purification is not necessary. The second reaction zone contains aromatic dicarboxylic acid(s), and optionally solvent and/or catalyst. The polymerization is then carried out. The activated charcoal may be added to the reaction zone either before or during the polymerization reaction. Alternatively, the diester derivative is added to the second reaction zone consisting of an aromatic dicarboxylic acid(s), and optionally, solvent and/or catalyst added thereto and the polymerization carried out. Here again the adsorbent may be added at any time during the polymerization. Any combination of adding the diester derivative, aromatic dicarboxylic acid(s), and optionally solvent and/or catalyst to a reaction vessel may be used.

In another embodiment of this invention, the diester derivative of the dihydric phenol is prepared in a reaction zone by reacting the acid anhydride and dihydric phenol therein under the esterification conditions described, supra. Residual acid anhydride may then be removed by the procedures described, supra. Aromatic dicarboxylic acid(s) and optionally solvent and/or catalyst is then added to the reaction zone and the polymerization reaction carried out to produce the polyarylate.

The dihydric phenol diester is prepared by reacting a dihydric phenol with an acid anhydride at a temperature of from about 130° to about 160° C. for a period of from about 0.5 to about 4 hours and at a pressure of from about 1 to about 3 atmospheres. Generally, the reaction is carried out using an excess of acid anhydride. The acid anhydride is used at about 25 percent excess. The process is preferably carried out at a pressure sufficient to have the mixture refluxing at the reaction temperature. Under these conditions conversion to the dihydric phenol diester is at least 99.9 percent.

The polymerization process is carried out at a temperature of from about 260° to about 350° C. and preferably, from about 275° to about 295° C. The polymerization process is generally conducted in an inert atmosphere (such as argon or nitrogen) so that the oxygen content therein is minimized or eliminated. The oxygen content is generally less than about 100, preferably less than about 30, and most preferably less than about 10 parts per million. The process is preferably carried out at a pressure sufficient to have the solvent refluxing at the reaction temperature. This pressure is generally from about atmospheric to about 11 atmospheres. Lower and higher pressures may also be used.

The polymerization reaction is conducted for a period of time sufficient to produce a polyarylate having a reduced viscosity of at least about 0.1 to greater than 1.0 dl/gm, which time is generally less than about 10 hours. The reaction time is generally in the range of from about 4 hours to about 8 hours, depending on the particular polyarylate being prepared.

The polymerization reaction of this invention may be carried out batchwise or continuously and by using any apparatus desired.

The polyarylates may be prepared in the presence of one or more thermoplastic polymers.

The thermoplastic polymers suitable for use in this invention include one or more of a polyester polymer, an aromatic polycarbonate, a styrene polymer, an alkyl acrylate polymer, a polyurethane, a vinyl chloride polymer, a poly(aryl ether), a copolyetherester block polymer, a polyhydroxyether, or combinations thereof, and the like.

The polyarylates produced by the process of this invention have a reduced viscosity of from about 0.1 to greater than 1.0 dl/gm, preferably from about 0.2 to about 1.0 dl/gm as measured in chloroform or other solvents known in the art, such as para-chlorophenol, phenol/tetrachloroethane (60:40), and the like. Reduced viscosities of the polyarylates measured in these solvents generally have the same range as those measured in chloroform.

The polyarylates may be prepared in the presence of materials such as molecular weight regulators, antioxidants, and the like.

The polyarylates obtained by the process of this invention may be used together with the well-known additives such as plasticizers, pigments, lubricating agents, mold release agents, stabilizers, inorganic fillers, and the like. These polyarylates may also further be blended with one or more thermoplastic polymers such as polyesters, polycarbonates, styrene polymers, alkyl acrylate polymers, polyurethanes, poly(aryl ether) polymers, polyamides, polyhydroxy ether polymers, copolyetherester block copolymers, polyamides, and the like.

EXAMPLES

The following examples serve to give specific illustrations of the practice of this invention but they are not intended in any way to limit the scope of this invention.

Preparation of polyarylate polymer

To a 250 ml 3-necked flask equipped with a nitrogen inlet, 30 cm vacuum jacketed column, mechanical stirrer, and a Teflon stir paddle was added 8.31 g. of isophthalic acid, 8.31 g. of terephthalic acid, 31.39 g. of bisphenol-A diacetate (prepared from bisphenol-A and acetic anhydride at 150° C. and recrystallized from cyclohexane) and 23.87 g of diphenylether (distilled). The system was sparged with nitrogen for one hour at about 190 ml/min. The reaction mixture was then heated to 270° C. in one hour and kept at that temperature for an additional 6 or 11 hours depending on whether lower molecular weights (reduced viscosity=0.3 dl/g) or higher molecular weight (reduced viscosity=0.6 dl/g) was desired. The color factor was obtained by dissolving the entire reaction mixture in enough chloroform in order to make a 5 weight percent solution, filtering out any contaminants, and measuring the solution transmission of the polymer on a Fisher Electrophotometer (Model 81) at 425 mm. The color factor was determined by using a correlation curve based on the comparison of the solution transmission and the color factor determined on a plaque by a yellowness index based on a chromaticity diagram derived in a manner similar to ASTM 1925 and the book by G. Wyszecki and W. S. Stiles, "Color Science," John Wiley & Sons, Inc., New York, 1967. In some cases the polymer solution is coagulated in methanol, dried, and redissolved in chloroform, filtered, and the solution transmission determined. No change in the transmission occurs during the coagulation step indicating that colored species are not removed by this process.

Post Treatment of polyarylate with charcoal

EXAMPLES 1 to 7

Polymers obtained by the process described in Preparation of polyarylate polymer, supra, were dissolved in chloroform to form a 5 percent solution and treated with various amounts of activated charcoal (Darco G-60, 200 Mesh obtained from Matheson, Coleman & Bell) at room temperature (about 25° C.) and refluxing chloroform.

The results are shown in Table I.

TABLE I

| Example | Activated Charcoal Charcoal (wt. %) | Time | (°C.) | Color Factor Before | After |
|---|---|---|---|---|---|
| 6 Hr Polymerizations - Reduced viscosity (RV) of 0.3 dl/g. | | | | | |
| Example 1 | 0.1% | 16 hrs | (25° C.) | 132 | 77.8 |
| Example 2 | 0.1% | 16 hrs | (reflux) | 132 | 77.8 |
| Example 3 | 0.5% | 30 min | (25° C.) | 132 | 75.9 |
| Example 4 | 1.0% | 24 hrs | (25° C.) | 104.3 | 63.8 |
| Example 5 | 1.0% | 24 hrs | (reflux) | 34.2 | 13.7 |
| 11 Hr Polymerizations - Reduced viscosity of 0.6 dl/g. | | | | | |
| Example 6 | 0.5% | 30 min | (25° C.) | 235 | 219 |
| Example 7 | 0.5% | 30 min | (25° C.) | 83.1 | 77.8 |

The data in the Table shows that activated charcoal treatments of lower molecular weights polyarylates (RV=0.3 dl/g) is more effective than treating a high molecular weight polyarylate (RV=0.6 dl/g).

EXAMPLES 8 to 17

Charcoal Treatments During Polymerization

The polymerizations in these Examples were carried out by the procedure described in Preparation of Polyarylate Polymer, supra, except that the activated charcoal (Examples 8 to 17) and silica gel (Example 18) was added together with the monomers, and the final polymer solution was filtered to remove the charcoal and silica gel, respectively, prior to the measurement of solution transmission.

The results are shown in Table II.

TABLE II

| Example | Activated Charcoal | React. Time(hrs.) | Color Factor |
|---|---|---|---|
| Control A | None | 6 | 132 |
| Example 8 | 1.0% Darco G-60 | 6 | 22.5 |
| Example 9 | 0.1% Darco G-60 | 6 | 48.2 |
| Example 10 | 3% Coconut Charcoal[1] | 6 | 60.4 |
| Example 11 | None | 11 | 196 |
| Example 12 | 1.0% Darco G-60 | 11 | 42.9 |
| Example 13 | 3% Coconut Charcoal[2] | 11 | 39.5 |
| Example 14 | 2% Nuchar[3] | 11 | 60.4 |
| Example 15 | 0.5% Nuchar | 11 | 69.1 |
| Example 16 | 0.2% Nuchar | 11 | 85.0 |
| Example 17 | 1.0% Nuchar | 11 | 69.1 |
| Example 18 | 2.0% silica gel[4] | 11 | 41.0 |

[1] 10 mesh, obtained from Matheson, Coleman and Bell (MCB)
[2] 10 mesh
[3] 20 × 50 mesh activated charcoal obtained from Westvaco Chemical Division
[4] grade 923, 100-200 mesh obtained from MCB The data in Table II shows that adding the charcoal at the same time the monomers are added is more effective than post treatment of the polymer with charcoal. Also, the data shows that effective decolorization is independent of the particle size of the activated charcoal when added at the beginning of the polymerization. The in situ charcoal treatment is more effective than post-treating the high molecular weight polymer.

EXAMPLES 19 and 20

In these examples the polymerization was carried out by the procedure described in the Preparation of polyarylate polymer, supra, except that the activated charcoal was added after the onset of polymerization.

The results are shown in Table III

TABLE III

| Example | Activated Charcoal | Color Factor |
| --- | --- | --- |
| Example 19 | 0.5% Nuchar, added 3 hrs after the temp reached 270° C. | 76 |
| Example 20 | 0.5% Nuchar, added 4 hrs after the temp reached 270° C. | 159 |

Control B

The following were charged into an agitated one-gal 316 SS reactor and de-aerated with nitrogen for two hours:
1206 gms Bisphenol-A diacetate
319.2 gms isophthalic acid,
319.2 gms terephthalic acid,
918 gms diphenyl ether, The mixture was heated to and held at 270° C. for about 6.5 hours. During this time, diphenyl ether was continuously pumped into the reactor and distillates taken overhead. Polymer concentration was maintained at an average of 58 percent.

The diphenyl ether feed was stopped and the reactor was pressurized to stop the distillation. Stabilizers were then added and the reaction mixture stirred for another 20 minutes. The polymer solution was then discharged. Polymer weight average molecular weight was 38,000 by GPC using polystyrene standard.

The results are shown in Table IV

EXAMPLE 21

The procedure of Control B was exactly repeated except that 55.3 gms. of Nuchar 20×50 mesh activated charcoal was added with the other ingredients. The results are shown in Table IV.

TABLE IV

| Example | Activated Charcoal | Color Factor |
| --- | --- | --- |
| Control B | None | 103 |
| Example 21 | 2 percent Nuchar | 37 |

What is claimed is:

1. An improved process for preparing a polyarylate having a reduced viscosity of from about 0.1 to greater than 1.0 dl/g which process comprises the following steps:
   (a) reacting an acid anhydride derived from an acid containing from 2 to 8 carbon atoms with at least one dihydric phenol to form the corresponding diester; and
   (b) reacting said diester with at least one aromatic dicarboxylic acid at a temperature sufficient to form the polyarylate, wherein the improvement comprises carrying out said process in the presence of from about 0.2 to about 2.0 weight percent, based on the weight of the reaction mixture of an adsorbent selected from silica gel, activated charcoal or a molecular sieve.

2. A process as defined in claim 1 wherein the adsorbent is activated charcoal.

3. A process as defined in claim 1, wherein the acid anhydride is acetic anhydride.

4. A process as defined in claim 1, wherein the dihydric phenol is of the following formula:

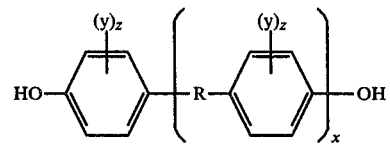

wherein y is independently selected from alkyl groups of 1 to 4 carbon atoms, chlorine or bromine, z independently has a value of from 0 to 4, inclusive, R is independently selected from a divalent saturated hydrocarbon radical having 1 to 8 carbon atoms, a cycloalkylene or cycloalkylidene radical having up to and including 9 carbon atoms, O, S, SO, $SO_2$, CO, x is 0 or 1.

5. A process as defined in claim 1, 3 or 4 wherein the dihydric phenol is bisphenol-A.

6. A process as defined in claim 1 wherein the isophthalic acid to terephthalic acid ration in the mixture of acids is about 20:80 to about 100:0.

7. A process as defined in claim 6, wherein the ratio is about 25:75 to about 75:25.

8. A process as defined in claim 1, wherein an aliphatic diacid containing from 2 to about 10 carbon atoms is added in step (b).

9. A process as defined in claim 8, wherein the diacid is selected from adipic acid or sebacic acid, or mixtures thereof.

10. A process as defined in claim 8 or 9, wherein from about 0.5 to about 20 percent of the diacid is added.

11. A process as defined in claim 1, wherein the diester is reacted with at least one aromatic dicarboxylic acid in the presence of an organic solvent.

12. A process as defined in claim 11, wherein the solvent is selected from a diphenyl ether compound, a cycloaliphatic compound or a substituted aromatic or heteroaromatic compound, or a halogenated and/or etherated substituted aromatic or heteroaromatic compound, or mixtures thereof.

13. A process as defined in claim 11, wherein the solvent is diphenyl ether.

14. A process as defined in claim 11 or 12, or 13, wherein the solvent is present in an amount of from about 10 to about 60 weight percent, based on the weight of the polyarylate polymer produced.

15. A process as defined in claim 11, wherein the solvent is present in an amount of from about 25 to about 60 weight percent, based on the weight of the polyarylate polymer produced.

16. A process as defined in claim 1, wherein the reaction in step (b) is carried out in the presence of a catalytically effective amount of a catalyst.

17. A process as defined in claim 16, wherein the catalyst is selected from the Group VII or Group VIII metal salts.

18. A process as defined in claim 17, wherein the salts are magnesium, manganese, or zinc salts.

19. A process as defined in claim 17 or 18, wherein the catalyst is magnesium acetate.

20. A process as defined in claim 1 wherein the temperature is from about 260° to about 350° C.

21. A process as defined in claim 1 or 20, wherein the temperature is from about 275° to about 295° C.

22. A process as defined in claim 1 wherein the process is carried out in the presence of a thermoplastic polymer.

23. A process as defined in claim 22 wherein the thermoplastic polymer is selected from a polyester, an aromatic polycarbonate, a styrene polymer, an allyl acrylate polymer, a polyurethane, a vinyl chloride polymer, a poly(aryl ether), a copolyetherester block polymer, a poly hydroxyether, or mixtures thereof.

24. A process as in claim 1 wherein the adsorbent is silica gel.

* * * * *